United States Patent Office 3,483,272
Patented Dec. 9, 1969

3,483,272
FIRE RETARDANT THERMOPLASTIC
COMPOSITIONS
Raymond R. Hindersinn, Lewiston, N.Y., assignor to
Hooker Chemical Corporation, Niagara Falls,
N.Y., a corporation of New York
No Drawing. Filed May 10, 1965, Ser. No. 454,685
Int. Cl. C08f 15/40, 37/02
U.S. Cl. 260—876                                13 Claims

ABSTRACT OF THE DISCLOSURE

Fire retardant polymeric compositions exhibiting superior thermal and mechanical properties and comprising a polymer of an ethylenically unsaturated hydrocarbon, and the adduct of a butadiene polymer and a polyhalogenated cyclopentadiene are provided. The novel compositions are useful in wire coatings, pipes and conduits, and for other industrial moldings and extruded products.

---

This invention relates to novel halogen-containing polymer compositions and to processes for producing such compositions. In another aspect, the invention relates to novel fire retardant polymer compositions, and to methods for rendering polymeric materials fire retardant.

Polymeric materials are being used more widely every year in industrial applications such as wire coatings, pipes and conduits, and for other industrial moldings and extruded products. These and other uses are better served by polymer compositions that are fire retardant and flame resistant. Prior art attempts to impart fire resistance to thermoplastic polymers by the use of additives have often adversely affected the desirable properties of the polymer. Thus in some cases, such additives exert a plasticizing effect on the base polymer, thereby lowering the heat distortion point. In other cases, the additives are volatile, and migrate out of the polymer, especially after extended exposure to elevated temperatures.

Accordingly, it is an object of this invention to provide superior fire retardant polymer compositions. It is another object of the invention to provide methods for reducing the flammability of the many normally flammable, thermoplastic polymer compositions. It is a further object of the invention to provide polymer compositions that are not only fire retardant but also have other superior thermal and mechanical properties.

This invention relates to polymer compositions comprised of a polymer of an ethylenically unsaturated hydrocarbon, and an adduct of a butadiene polymer and a polyhalogenated cyclopentadiene having the formula

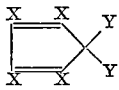

wherein X is selected from the group consisting of fluorine, chlorine and bromine, and Y is selected from the group consisting of fluorine, chlorine, bromine and an alkoxy radical. The proportion of polyhalogenated cyclopentadiene generally ranges between about 0.2 and 0.9 mole per mole of combined butadiene, preferably 0.6 to 0.9 mole per mole. When the halogenated cyclopentadiene is hexachlorocyclopentadiene, an incorporation of 0.6 to 0.9 mole per mole provides a chlorine content of about 59 to 64 weight percent. The invention further relates to processes for producing the foregoing polymer compositions.

The polymers of an ethylenically unsaturated hydrocarbon embraced within the scope of this invention are the homopolymers and copolymers of unsaturated aliphatic, cycloaliphatic and aromatic hydrocarbons. Suitable monomers generally have two to about eight carbon atoms per molecule. Typical monomers used for the production of such polymers are ethylene, propylene, butene, pentene, hexene, heptene, octene, 2-methyl propene-1, 3-methyl butene-1, 4-methyl pentene-1, 4-methyl hexene-1, 5-methyl hexene-1, bicyclo-(2.2.1)-2-heptene, butadiene, pentadiene, hexadiene, isoprene, 2,3-dimethylbutadiene-1,3, 2-methylpentadiene - 1,3, 4 - vinylcyclohexene cyclopentadiene, styrene, methyl styrene, and the like. Homopolymers of the foregoing monomers can be employed, as well as copolymers such as ethylene-propylene copolymers, ethylene-butene copolymers, ethylene-hexene copolymers, and the like. Also suitable are the graft and block copolymers of the foregoing monomers, such as the graft copolymers of polybutadiene with polymerizable compounds such as styrene, α-methyl styrene, and the like. Other suitable polymers of an ethylenically unsaturated hydrocarbon include graft copolymers involving other polymerizable compounds containing aliphatic carbon-to-carbon unsaturation, such as graft copolymers of a polybutadiene with styrene and acrylonitrile.

The preferred homopolymers of an ethylenically unsaturated hydrocarbon are polypropylene, polyethylene and polystyrene. Low density polyethylenes are produced by polymerization of ethylene at a pressure greater than 1200 atmospheres and at a temperature of 100 to 300 degrees centigrade. Lower pressures of about 500 atmospheres can be used if a catalyst such as oxygen or benzoylperoxide is employed. Polyethylenes and polypropylenes are also produced with organometallic catalysts and supported metal oxide catalysts in the presence of an inert, hydrocarbon solvent at temperatures in the range of 50 to 230 degrees centigrade. Polystyrene is readily produced by mass, solution or emulsion polymerization techniques. The polymerization is promoted by the action of light and catalysts such as hydrogen peroxide, benzoylperoxide and other organic peroxides. Such solvents for solution polymerization include toluene, xylene and chlorobenzene.

The preferred graft copolymers for use in preparing the compositions of the invention are the copolymers of a polymerizable compound containing aliphatic carbon-to-carbon unsaturation and a butadiene polymer, particularly a polybutadiene. Typical polymers of butadiene are the various ethylenically unsaturated polybutadienes prepared by mass, solution or emulsion polymerization techniques, butadiene-styrene block copolymers produced by emulsion and solution methods, and the like. The polymerizable compounds useful in preparing the graft copolymers are generally those unsaturated monomers containing aliphatic carbon-to-carbon unsaturation, which are polymerizable or copolymerizable by free radical catalysts either alone or in admixture with other polymerizable compounds. Suitable polymerizable compounds include the vinyl aromatic compounds such as styrene, vinyl toluene and α-methyl styrene; acrylonitrile, methacrylonitrile, and the like; the acrylamides, such as acrylamide, N,N - dimethyl acrylamide, N - cyclohexyl acrylamide, methacrylamide, and the like; acrylic acid and its esters such as methyl acrylate, butyl acrylate, methoxy ethyl acrylate, and the like; methacrylic acid and its esters such as methyl methacrylate, lauryl methacrylate, and the like; crotonic acid and its esters, such as ethyl crotonate, and the like; alpha, beta-unsaturated acids and esters, such as maleic anhydride, fumaric acid, dimethyl maleate, and the like; and other polymerizable or copolymerizable, unsaturated monomers. Especially useful are mixtures of the foregoing monomers.

The polyhalogenated cyclopentadienes useful in forming the adducts with butadiene polymers generally have the formula:

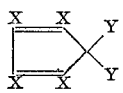

wherein X is selected from the group consisting of fluorine chlorine and bromine, and Y is selected from the group consisting of fluorine, chlorine, bromine and an alkoxy radical. Typical polyhalogenated cyclopentadienes are hexachlorocyclopentadiene, hexabromocyclopentadiene, 5,5 - dibromotetrachlorocyclopentadiene, 5,5 - difluorotetrachlorocyclopentadiene, 5,5 - dimethoxytetrachlorocyclopentadiene, 5,5 - diethoxytetrachlorocyclopentadiene, and the like. Generally, the alkoxy radicals have one or two carbon atoms, but higher carbon chains, for example, up to four carbon atoms, can be employed.

Polymers of butadiene that can be reacted or adducted with the polyhalogenated cyclopentadienes are the various ethylenically unsaturated polybutadienes prepared by mass, solution or emulsion polymerization techniques, butadiene-styrene copolymers by emulsion and solution methods, butadiene-styrene block copolymers, butadiene-acrylonitrile copolymers, and the like. Particularly useful are the polybutadienes which contain at least 30 percent of the cis 1,4-confiuration, and preferably at least 80 percent of the cis 1,4-configuration, and still more preferably at least 90 percent of the cis 1,4-configuration. A process for producing a polybutadiene having such a high cis 1,4-content comprises reacting 1,3-butadiene in the presence of a catalyst composition comprising titanium tetra-iodide and an organo metal compound such as dimethyl mercury, diethyl mercury, dibutyl mercury, dimethyl zinc, dibutyl zinc, and the like. The reaction is carried out at a temperature in the range of minus 80 to 150 degrees centigrade in the presence of a hydrocarbon diluent such as toluene. At the completion of the polymerization reaction, the catalyst is deactivated and the polymer is precipitated from the reaction mixture.

In the process for adducting the halogenated cyclopentadiene to a butadiene polymer by the Diels-Alder reaction, it is preferred to utilize in the reaction mixture at least about 5 parts of polyhalogenated cyclopentadiene per part of butadiene polymer. However, lower ratios, such as 3 or 4 parts of halogenated cyclopentadiene can be used per part of butadiene polymer, but longer reaction times are then desirable. Much larger quantities of halogenated cyclopentadiene can be utilized, e.g., up to 100 parts of halogenated cyclopentadiene per part of butadiene polymer and higher. In fact, it is convenient to use the halogenated cyclopentadiene as the diluent in the reaction mixture. However, other diluents that are not deleterious to the reaction can be used, for example, the aromatic hydrocarbons such as benzene, toluene, xylene, and the like; chlorinated hydrocarbons such as trichloroethylene, tetrachloroethane, the chlorobenzenes, the chlorotoluenes, and the like; esters such as isobutyl acetate, ethyl butyrate, and the like. The ratio of solvent used in the reaction mixture generally does not exceed about 100 parts per part of butadiene polymer reacted. The reaction proceeds best at elevated temperatures, generally in the range of 70 to 200 degrees centigrade, preferably in the range of 100 to 170 degrees centigrade. It is generally convenient to conduct the reaction at atmospheric pressure, although, depending on the use of particular diluents and reaction temperatures, it is sometimes convenient to carry out the reaction at super atmospheric pressure or under vacuum. During the course of the reaction, some halogen halide may be produced. The color of the resulting product can be improved by absorbing the hydrogen halide by including a scavenger, such as an epihalohydrin or other epoxide, in the reaction zone. It is sometimes desirable to include other additives in the reaction mixture to control the molecular weight of the polymer product.

The flame retardant characteristics of the polymer compositions of the invention are further improved by incorporating antimony compounds therein. Antimony oxide is the preferred antimony compound. However, many other antimony compounds are suitable. Inorganic antimony compounds include antimony sulfide, sodium antimonite, potassium antimonite, and the like. Many organic antimony compounds are suitable, such as the antimony salts or organic acids and their pentavalent derivatives. Typical compounds of this class include antimony tributyrate, antimony trivalerate, antimony tricaproate, antimony triheptylate, antimony tricaprylate, antimony tripelargonate, antimony tricaprate, antimony dicaproate-monocaprate and antimony trianisate and their pentavalent dihalide derivatives such as antimony tributyrate dibromide and antimony tricaproate dichloride, and the like. Likewise, the esters of antimonious acids and their pentavalent derivatives can be employed. Typical of the latter compounds are tris(n-octyl) antimonite, tris(2-ethylhexyl) antimonite, tribenzyl antimonite, tris(α-chloroethyl) antimonite, tris(α-chlorobutyl) antimonite, and their pentavalent dihalide derivatives, such as tris(n-octoxy) antimony dibromide, tribenzoxy antimony dibromide, tris(α-chloroethoxy) antimony dibromide, and the like. Still other suitable organic antimony compounds are the cyclic antimonites such as trimethylolpropane antimonite, pentaerythritol antimonite, and glycerol antimonite. The corresponding arsenic and bismuth compounds can also be employed.

Stabilizers can be advantageously employed in the compositions of the invention to protect them against degradation. Suitable stabilizers can be classified into four groups. A more detailed description follows the ensuing brief description.

The first group of stabilizers are compositions comprising (A) (1) a polyvalent metal salt of a carboxylic acid, and/or (2) a polyvalent metal salt of a phenol; and/or (B) an organic phosphate, particularly the trihydrocarbon phosphates.

The second group of stabilizers of this invention are compositions comprised of a substituted phenol having from about 7 to about 30 carbon atoms, a polyvalent metal salt of an organic carboxylic acid having from about 6 to 18 carbon atoms and a polyol having the structure

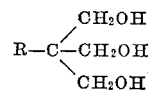

The third group of color stabilizers of this invention comprise an organotin compound having organic radicals linked to tin only through carbon or oxygen, at least two organic radicals being linked through carbon, and at least one organic radical being linked through oxygen to a carbonyl group of an unsaturated dicarboxylic acid ester of an alcohol having from one to two hydroxyl groups.

In addition to the foregoing three classes of organo metallic compounds, useful stibilizers in this invention include tetraphenyl tin, stannous dioctoate and triphenyl tin hydroxide.

*Group one stabilizers.*—More particularly, the first group of organo metallic stabilizer compositions are comprised of a polyvalent metal phenolate, an organic phosphite and a polyvalent metal salt of a benzoic acid.

The polyvalent metal phenolates in this composition have the general formula $M(OR)_n$ wherein $n$ is the valence of the metal (M), M is selected from cadmium, zinc, lead, tin, barium, strontium, and calcium, and R is selected from alkyl substituted phenols and alkyl substituted phenols containing at least one substituent on the alkyl radical which has from 1 to 20 carbon atoms. The polyvalent radical phenolates of the substituted phenols listed below are illustrative of the phenolates that are employed in the stabilizers; butyl-phenol, monochlorooctylphenol, nonylphenol, oleylphenol, laurylphenol, octadecylphenol and dibutylmethyl phenol, etc. The preferred phenolates are barium phenolates containing straight chain alkyl substituents having 6 to 13 carbon atoms; especially preferred are barium octyl phenolate and barium nonyl phenolate.

The organic phosphites utilized in the stabilizer composition of Group 1 are selected from the class consisting of substituted or unsubstituted alkyl or phenyl phosphites, phosphites containing both alkyl and phenyl groups, organo halo phosphites and phosphorus halides containing one or two substituted or unsubstituted alkoxy and/or phenoxy groups bonded to the phosphorus atom. Each organo substituent group of the phosphite contains from 1 to 15 carbon atoms. The phosphite utilized, should be substantially nonvolatile at the conditions under which the resin is worked.

Polyvalent metal salts of the substituted or nonsubstituted benzoic acid employed in group one include the salts of cadmium, zinc, lead, tin, barium, strontium, and calcium. The substituted benzoic acid may contain ring substitution which does not deleteriously affect the properties of the polymer and is not reactive with other components of the formulation, thereby effecting the polymer composition to be protected. Useful permissible substituting groups include fluorine, chlorine, and up to three alkyl (linear or branched) groups, for example, methyl, isopropyl, tertiary butyl, and so forth, the total number of carbon atoms in the substituting alkyl (linear or branched) group being not more than 12. The preferred metal salts are those of cadmium; and the preferred salts are cadmium benzoate and cadmium di(t-tert-butylbenzoate).

These stabilizer compositions contain between about 20 and about 80 percent, preferably about 20 to about 40 percent of the polyvalent salt of the benzoic acid, about 80 to about 20 percent and preferably about 60 to about 40 percent of the polymetallic phenolate and about 0.5 to about 50 percent and preferably about 8 to about 30 percent of the phosphite. The preferred stabilizer contains about 20 to 40 percent cadmium di(p-tert-butylbenzoate) or cadmium benzoate, about 45 to about 55 percent of barium octyl phenolate or nonylphenolate and the remainder triphenylphosphite, diphenylchloroethyl phosphite or diphenylchloropropyl phosphite.

Stabilizing compositions of Group one are further exemplified in the art such as U.S. Patent 2,935,491 issued May 3, 1960.

*Group two stabilizers.*—The second group of color stabilizers of this invention are compositions comprised of a polyol, a polyvalent metal salt and a phenol. The polyols employed in the color stabilizer compositions of this group have the structure:

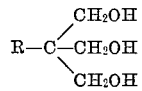

wherein R is hydrogen, alkyl, alkoxy group, hydroxyalkyl, or alkoxy hydroxyalkyl. The R radical in general has from 1 to about 30 carbon atoms. The typical polyols of this formula include dipentaerythritol, trimethylolpropane, trimethylolmethane, trimethylolethane and trimethylolbutane.

The metal salt stabilizer is a salt of a polyvalent metal and a monocarboxylic organic acid having from 6 to 18 carbon atoms. The acid contains no nitrogen atoms in the molecule. As a class these acids can be aliphatic, aromatic, alicyclic or oxygen containing heterocyclic monocarboxylic acids. The acids may be substituted with groups, such as halogen, sulfur and hydroxyl. As exemplary of such acids are: caproic acid, capric acid, 2-ethyl hexoic acid, lauric acid, chlorocaproic acid, hydroxy capric stearic acid, hydroxy stearic acid, oleic acid, myristic acid, dodecyl thioether propionic acid, monoethyl ester of phthalic acid, ethyl benzoic acid, isopropyl benzoic acid, p-tert-butyl benzoic acid, n-hexylbenzoic acid, salicylic acid, naphthoic acid, 1-naphthylene acetic acid, orthobenzoyl benzoic acid, methyl furoic acid, and the like. These are used in the form of their metal salts, particularly the alkaline earth metal salts, such as magnesium, barium, strontium, calcium, zinc, cadmium, lead, and tin salts. The barium, cadmium and zinc compounds are preferred. Suitable salts include barium laurate, cadmium laurate, cadmium benzoate, cadmium tert-butyl benzoate, cadmium stearate, zinc stearate and the like.

The third component of the composition of group two color stabilizers is a hydrocarbon substituted phenol having at least one phenolic hydroxyl group and from 1 to about 30 carbon atoms per phenolic hydroxyl group. The phenol contains one or more phenolic hydroxyl groups and may contain one or more phenolic nuclei. The phenol has one or a plurality of alkyl, aryl, or cycloalkyl substituents or a second ring condensed therewith such as a naphthol, having one or more carbon atoms, up to the total number of carbon atoms per phenolic hydroxyl group. Usually the phenols have up to about 18 carbon atoms in any alkyl, aryl, cycloalkyl, cycloalkenyl or alkylene group.

Exemplary phenols are ortho- meta- and para-cresol, ortho- meta- and para-phenyl phenol, xylenol, nonylphenol, dodecyl phenol, octyl phenol, octyl resorcinol, dodecyl resorcinol, octadecyl catachol, isooctyl phloroglucinol, 2,6-tritertiary butyl resorcinol, 2,2-bis (4-hydroxy phenol) propane, alpha and beta naphthol, mono and di tert-butyl substituted alpha and beta naphthols and the like.

The three components of the stabilizer of group 2 are utilized in the proportion of about 5 to 60 percent polyol, from about 5 to 60 percent hydrocarbon substituted phenol and from 90 to 35 percent metal salt.

*Group three stabilizers.*—The preferred organo tin compounds utilized in the third group of stabilizers are of the formula:

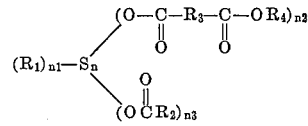

wherein $R_1$ and $R_2$ are hydrocarbon radicals having from about 1 to about 30 carbon atoms, which can contain inert substituents such as halogen, ether and ester groups. $R_1$ can, for example, be an aliphatic group, such as alkyl and alkenyl, cycloaliphatic, such as cycloalkyl and cycloalkenyl, or a heterocyclic group. Included are radicals such as methyl, ethyl, isopropyl, butyl, vinyl, tertiary butyl, hexyl, oleyl, 2-ethylhexyl, lauryl, stearyl, allyl, furfuryl cyclohexyl, cyclopentyl, tetrahydropryanyl and tetrahydrofurfuryl.

The

group can be derived from an organic carboxylic acid of the formula $R_2COOH$ including aliphatic, aromatic, cycloaliphatic and heterocyclic acid which can contain inert substituents, such as halogen, hydroxyl, keto and alkoxy groups. Illustrative acids include acetic acid, propionic acid, oleic acid, ricinoleic acid, linoleic acid, stearic acid, maleic acid, chloroacetic acid, hexanoic acid, octanoic acid, lactic acid, levulinic acid, 4-methoxy butyric acid, lauric acid, behenic acid, palmitic acid, benzoic acid, methylbenzoic acid and furoic acid.

$R_3$ is a hydrocarbon group containing from one to about 30 carbon atoms and containing an ethylenic double bond. The ethylenic double bond is alpha to a carboxyl group. The $R_3$ groups are derivable from alpha unsaturated dicarboxylic acid containing from about 4 to about 10 carbon atoms, such as maleic acid, fumaric acid, itaconic acid, glutaconic acid, citraconic acid, 2-hexane-1,4-dicarboxylic acid, 2-octene-1,8-dioic acid and 2,5-heptadienedioic acid.

The $R_4$ is an organic group derivable from a monohydric or a polyhydric alcohol. $R_4$ can be alkyl, alkenyl, alkylene, arylene, mixed alkyl-aryl, cycloaliphatic and heterocyclic and contain from about 1 to 30 carbon atoms and also contain ester groups, alkoxy groups, hydroxyl groups and other inert substituents. Preferably $R_4$ is derived from a dihydric alcohol such as glycol containing from 2 to about 30 carbon atoms including ethylene glycol, propylene glycol, diethylene glycol, dipropylene glycol, tetramethylene glycol, neopentyl glycol and decamethylene glycol or from monohydric alcohols containing from one to 30 carbon atoms, such as methyl, ethyl, propyl, n-butyl, t-butyl, isobutyl, octyl, decyl, and lauryl alcohols.

The sum of $n_1$, $n_2$ and $n_3$ is four, $n_1$ is either two or three, and both $n_2$ and $n_3$ can range from zero to two.

Typical organo tin compounds employable in this invention include dibutyltin-bis(dipropylene glycol maleate), di-n-octyltin bis(dipropylene glycol monomaleate), tri-n-octyl-tin monoisooctyl maleate, dibutyltin diacetate, dibutyltin dilaurate, dibutyltin-bis (monoisooctyl fumarate), di(n-octyl)tin-di(monoisooctyl maleate), dibutyltin-bis(monoisooctyl maleate), ethyl n-butyltin-bis (octyl maleate), diisobutyltin-bis(propylene glycol monomaleate), diisopropyltin-bis(dipropylene glycol maleate), n-butyl undecyltin-bis(diethylene glycol monomaleate), di-n-butyltin-bis(ethoxyethyl maleate), isobutyl cyclohexyltin monophenylmaleate monoethoxy ethylmaleate, isooctyl undecyltin monoisooctyl-maleate dipropylene glycol monomaleate and the like.

The components comprising the compositions of the invention can be mixed by any one of several methods. The polyhalogenated polymer can be introduced into the polymer of an ethylenically unsaturated hydrocarbon while the latter polymer is dissolved in a suitable solvent. Also the polymer of an ethylenically unsaturated hydrocarbon can be introduced into the polyhalogenated polymer while the latter is dissolved in a suitable solvent. These procedures are especially useful when it is desired to mix the components during the polymer manufacturing processes. When the polymer is subsequently recovered from the solvent, the components are intimately mixed. Furthermore, the components can be mixed in the dry state, and thereafter heated to the molten state at temperatures in the range from the melting point or softening point of the polymer to the decomposition temperature thereof. Still further, the polymer components can be separately elevated to the molten state and intimately mixed in this condition at temperatures that can range from the melting point or softening point of the polymers to the decomposition temperature thereof. Other additives such as the antimony compounds, as well as fillers, pigments and the like, can be introduced to the polymer composition at any one of a number of points in the foregoing procedures.

The polymer compositions of the invention generally comprise from about 5 to about 50 percent by weight of polyhalogenated polymer based on the weight of the total polymer composition. The "total polymer composition" includes both the polyhalogenated polymer and the polymer of an unsaturated hydrocarbon. The preferred range is from about 10 to about 40 percent by weight; still more preferably, the range is from about 15 to about 35 percent by weight of the polyhalogenated polymer. When an antimony compound is employed in the polymer compositions, the antimony compound can be used in a proportion up to about 30 percent by weight of the polymer composition, preferably from about 2 to about 20 percent by weight. The polymer compositions of the invention generally comprise at least about 50 percent by weight of the ethylenically unsaturated hydrocarbon polymer.

The invention is further described in the following specific examples which are intended to further illustrate the invention but not to limit it. In these examples, the temperatures are given in degrees centigrade, and parts are by weight unless specified otherwise.

EXAMPLE 1

Preparation of polyhalogenated polymer 6.75 parts by weight of a polybutadiene rubber having at least 95 percent cis-1,4 content, and 1.6 parts by weight of epichlorohydrin were mixed with 81 parts by weight of hexachlorocyclopentadiene. The mixture was heated at about 100 degrees centigrade until the rubber was in solution. The temperature was elevated to 150 degrees and maintained for one hour while the reaction proceeded in an air atmosphere. Then the reaction mixture was blanketed with nitrogen, 0.275 part of m-dinitrobenzene was added and the reaction was completed at 150 degrees in 4 hours. The resulting polymer solution was emulsified with water in the presence of oxyethylated nonylphenol, and the emulsion was discharged into n-amyl alcohol to precipitate the polymer. The polymer was washed with n-amyl alcohol and isopropyl alcohol. Analysis of the polymer indicated it had a chlorine content of 58.7 percent and an intrinsic viscosity of toluene of 0.462.

EXAMPLE 2

Twenty-five parts by weight of a polybutadiene rubber having a cis-1,4 content of about 95 percent and 300 parts by weight of hexachlorocyclopentadiene that had been treated with magnesium carbonate for removal of impurities, were introduced into a reactor. With the reactor open to the atmosphere, the reaction mixture was heated for 7.5 hours at 130 degrees centigrade to dissolve the rubber, and then for 5 hours at 150 degrees centigrade with agitation. Then, 200 parts by weight of the resulting polymer solution were mixed with 100 parts by weight of water and about 5 parts of oxyethylated nonylphenol at about 30 degrees centigrade. The resulting dispersion was discharged into n-amyl alcohol. The resulting white, powdered polymer was centrifuged from the dispersion, washed with n-amyl alcohol, then with isopropyl alcohol, and then dried in a vacuum oven for about 6 hours at 140 degrees centigrade and 3 millimeters of mercury pressure. The polymer product had a chlorine content of about 59 weight percent.

EXAMPLE 3

Fifteen parts by weight of polybutadiene having a cis-1,4 content of about 95 percent, 180 parts by weight of 1,2,3,4-tetrachloro-5,5-dimethoxyclyclopentadiene, and 3 parts by weight of epichlorohydrin were heated in an open reactor at 98–106 degrees centigrade for about 1 hour until the rubber was in solution. The reactor temperature was raised to 150 degrees centigrade for 5 hours. The polymer product was precipitated from solution with isopropyl alcohol, redissolved in xylene, and reprecipitated from solution twice with isopropyl alcohol. The resulting white solid product had a chlorine analysis of 39.4 weight percent.

EXAMPLE 4

Seventy-five parts by weight of a polybutadiene having a cis-1,4 content of 35 percent were heated with 600 parts by weight of hexachlorocyclopentadiene and about 15 parts by weight of epichlorohydrin at 100–112 degrees centigrade for 3 hours in an air atmosphere. Then an additional 300 parts by weight of hexachlorocyclopentadiene were added to the reactor, and heating was continued until all the rubber was in solution. Thereafter, the reaction temperature was raised to 147–150 degrees centigrade for about 8.5 hours. The reaction product was emulsified in water with oxyethylated nonylphenol and and precipitated with n-amyl alcohol. The resulting solid polymer product was redissolved in xylene, and reprecipitated twice with isopropyl alcohol. The solid product was dried in a vacuum oven and was found to have a chlorine content of 50.8 weight percent.

EXAMPLES 5 to 7

Polymer compositions of invention

The polyhalogenated polymer of Example 2 was dry blended in various proportions with pulverized, isotactic polypropylene and antimony oxide. The proportions of components are shown in Table 1.

TABLE 1

|  | Example No. | | |
|---|---|---|---|
|  | 5 | 6 | 7 |
| Polypropylene, weight percent | 55 | 70 | 70 |
| Polyhalogenated polymer, weight percent | 30 | 20 | 30 |
| Antimony oxide, weight percent | 15 | 10 | 0 |

Test specimens were prepared from the polymer composition of Example 5, and subjected to a modified ASTM Test D635–56T wherein the standard ASTM D635–56T test is modified by using a 0.25 inch diameter molded rod instead of the standard 5 x ½ x ⅛ inch test bar. (ASTM refers to American Society for Testing Materials). The flammability test results are shown in Table 2, where comparison is made with a sample of polypropylene alone. It was observed that the test specimens employed in Example 5 did not drip during ignition or burning, and that considerable, desirable intumescense occurred.

The polymer composition of Example 5 was injection molded into test speciments, which were subjected to a number of mechanical and electrical tests, the results of which are shown in Table 2, together with similar properties for polypropylene alone.

TABLE 2

|  | Polymer of Example 5 | Polypropylene alone |
|---|---|---|
| Flammability, modified ASTM D–635–56T | (¹) | (²) |
| Heat distortion temperature in ° C. at 66 pounds per square inch | 139 | 110 |
| Shore D hardness | 78.6 | 73 |
| Flexural yield strength, pounds per square inch | 9,250 | 8,320 |
| Flexural modulus, pounds per square inch | 3.41×10⁵ | 2.77×10⁵ |
| Dielectric Strength: | | |
| Step by step, volts/mil | 683 | 537 |
| Short time, volts/mil | 678 | 527 |
| Dielectric constant: | | |
| 10³ cycles per second | 2.58 | 2.33 |
| 60 cycles per second | 2.64 |  |
| Dissipation Factor: | | |
| 10⁶ cycles per second | 0.0046 | 0.0004 |
| 60 cycles per second | 0.0066 |  |

¹ Immediately self-extinguishing.
² Burning.

The foregoing data indicate that the polymer composition of the invention has a heat distortion point at 66 pounds per square inch of 29 degrees centigrade greater than the value for the polypropylene alone. Moreover, the hardness of the composition of the invention is improved somewhat, and properties such as flexural strength and flexural modulus are not adversely affected by the incorporation of the polyhalogenated polymer into the polypropylene.

The heat resistance of the polymer composition made in accordance with Example 5 was determined by heating a sample of the polymer at 120 degrees centigrade in an air-circulating oven for 90 days. After the 90 day test period, the polymer composition of the invention exhibited a weight loss of only one percent of its original weight, and the fire retardance of the heat-aged composition was substantially the same as that of the composition prior to heat aging. The thermal stability of the polymer composition of the invention was further tested by subjecting composition made in accordance with Example 5 to the molding temperature of 190 degrees centigrade for periods of up to 1 hour. The characteristics of the resulting polymer composition were substantially unchanged as indicated by the fact that the polymer composition had substantially the same heat distortion points at 66 pounds per square inch before and after the test period.

The polymers of Examples 3 and 4 are also employed in the manner of the foregoing Example 5 to provide polymer compositions of the invention with similar useful properties.

EXAMPLES 8 TO 11

In Examples 8 to 11, the polyhalogenated polymer of Example 1 was blended in various proportions with 0.924 density polyethylene and antimony oxide, and test specimens were prepared by injection molding for use in evaluating the flame resistance of the compositions. The proportions of the components of the compositions prepared in Examples 8 to 11 are shown in Table 3, together with the fire resistance of the several compositions. Comparison is also made with results of subjecting polyethylene alone to the flammability test.

TABLE 3

|  | Example No. | | | | Control |
|---|---|---|---|---|---|
|  | 8 | 9 | 10 | 11 |  |
| Polyethylene, weight percent | 47.5 | 55 | 62.5 | 70 | 100 |
| Polyhalogenated polymer, weight percent | 35.0 | 30 | 25 | 20 | 0 |
| Antimony oxide, weight percent | 17.5 | 15 | 12.5 | 10 | 0 |
| Flammability, modified ASTM D635–56T¹ | I.S.E. | I.S.E. | S.E. | S.E. | Burning |

¹ I.S.E. immediately self-extinguishing; S.E. self-extinguishing.

In addition to the foregoing data indicating fire resistance of the composition of the invention, it was further observed that the samples of polymer compositions of the invention did not drip when subjected to the flammability test, whereas polyethylene alone drips and runs severely. Thus, in the presence of a fire, polyethylene alone not only burns readily but also would contribute to the spread of the flames as a result of the flow of the molten polymer.

The polymer composition of Example 9 was subjected to a number of mechanical tests to determine the physical properties of the composition. The test results are shown in the Table 4.

TABLE 4

|  | Polymer of Example 9 | Polyethylene alone |
|---|---|---|
| Heat distortion temperature in ° C. at 66 pounds per square inch | 73 | 45 |
| Shore D hardness | 57 | 52 |
| Flexural yield strength, pounds per square inch | 2,150 | 1,372 |
| Flexural modulus, pounds per square inch | 6.5×10⁴ | 2.58×10⁴ |

From the foregoing data, it is apparent that the incorporation of both the polyhalogenated polymer and an antimony compound in the compositions with polyethylene results in a product that is far superior to the polyethylene alone, not only in fire retardancy but also in mechanical properties.

Other polymers of unsaturated hydrocarbons, such ethylene-butene copolymers, butadiene-styrene graft and block copolymers, polybutadiene, polyisobutylene, and the like, can be employed in place of the polyethylene of Example 9 to provide polymer compositions of the invention with similar useful properties.

EXAMPLE 12

A polymer composition was prepared by mixing 55 parts by weight of polystyrene, having an intrinsic viscosity of 0.923, 30 parts by weight of polyhalogenated polymer of Example 1 and 15 parts by weight of antimony oxide. The resulting polymer composition was tested for flammability using the modified ASTM D-635-56T Test, and found to be self-extinguishing. Also the composition did not run or drip when subjected to the flame. By contrast, polystyrene alone burns readily, and drips excessively when subjected to the same test.

EXAMPLE 13

A polymer composition was prepared using a graft copolymer comprised of about 30 percent polybutadiene and 70 percent of a mixture of styrene and acrylonitrile, and having an intrinsic velocity of 0.42. 55 parts of the graft copolymer were mixed with 30 parts by weight of the polyhalogenated polymer of Example 1, and 15 parts by weight of antimony oxide. The composition was tested for flammability using the modified ASTM D-635-56T Test, and found to be self-extinguishing. Also the composition did not run or drip when subjected to the flame. By contrast, the graft copolymer alone burns readily, and drips excessively when subjected to the same test.

Other graft copolymers, such as polybutadiene-methyl methacrylate copolymers, polybutadiene-α-methylstyrene-acrylonitrile copolymers, and the like can be employed in place of the graft copolymer used in Example 13 to provide polymer compositions of the invention with similar useful properties.

While the invention has been described with reference to certain specific embodiments, it will be recognized by those skilled in the art that many variations are possible without departing from the spirit and scope of the invention.

What is claimed is:

1. A polymer composition comprising a thermoplastic polymer of an ethylenically unsaturated aliphatic, cycloaliphatic or aromatic hydrocarbon of 2 to about 8 carbon atoms per molecule, and the adduct of a butadiene polymer and a polyhalogenated cyclopentadiene, wherein said adduct comprises about 0.2 to 0.9 mole polyhalogenated cyclopentadiene per mole of combined butadiene and wherein said adduct comprises from about 5 to about 50 percent by weight of the total polymer composition.

2. A polymer composition comprising a thermoplastic polymer of an ethylenically unsaturated aliphatic, cycloaliphatic or aromatic hydrocarbon of 2 to about 8 carbon atoms per molecule, and an adduct of a polybutadiene and hexachlorocyclopentadiene, wherein said adduct comprises about 0.2 to 0.9 mole hexachlorocyclopentadiene per mole of combined butadiene and wherein said adduct comprises about 5 to about 50 percent by weight of the total polymer composition.

3. The polymer composition of claim 2 wherein the polymer of an ethylenically unsaturated hydrocarbon is polypropylene.

4. The polymer composition of claim 2 wherein the polymer of an ethylenically unsaturated hydrocarbon is polyethylene.

5. The polymer composition of claim 2 wherein the polymer of an ethylenically unsaturated hydrocarbon is polystyrene.

6. The polymer composition of claim 2 wherein the polymer of an ethylenically unsaturated hydrocarbon is a graft copolymer of polybutadiene with styrene and acrylonitrile.

7. A fire retardant polymer composition comprising a thermoplastic polymer of an ethylenically unsaturated aliphatic, cycloaliphatic or aromatic hydrocarbon of 2 to about 8 carbon atoms per molecule, an adduct of a butadiene polymer and a polyhalogenated cyclopentadiene, and an antimony compound, the adduct and antimony compound being present in sufficient total proportion to improve the fire retardancy of the polymer composition, wherein said adduct comprises about 0.2 to 0.9 mole polyhalogenated cyclopentadiene per mole of combined butadiene and wherein said adduct comprises from about 5 to about 50 percent by weight of the total polymer composition.

8. A fire retardant polymer composition comprising a thermoplastic polymer of an ethylenically unsaturated aliphatic, cycloaliphatic or aromatic hydrocarbon of 2 to about 8 carbon atoms per molecule, an adduct of a polybutadiene and hexachlorocyclopentadiene, an antimony compound, the adduct and antimony compound being present in sufficient total proportion to improve the fire retardancy of the polymer composition, wherein said adduct comprises about 0.2 to 0.9 mole hexachlorocyclopentadiene per mole of combined butadiene and wherein said adduct comprises from about 5 to about 50 percent by weight of the total polymer composition.

9. The composition of claim 8 wherein the antimony compound is antimony trioxide.

10. The polymer composition of claim 9 wherein the polymer of an ethylenically unsaturated hydrocarbon is polypropylene, and said adduct is present in a proportion in the range of 10 to 40 weight percent of the total composition.

11. The polymer composition of claim 9 wherein the polymer of an ethylenically unsaturated hydrocarbon is polyethylene, and said adduct is present in a proportion in the range of 10 to 40 weight percent of the total composition.

12. The polymer composition of claim 9 wherein the polymer of an ethylenically unsaturated hydrocarbon is polystyrene, and said adduct is present in a proportion in the range of 5 to 50 weight percent of the total composition.

13. The polymer composition of claim 9 wherein the polymer of an ethylenically unsaturated hydrocarbon is the graft copolymer of polybutadiene with styrene and acrylonitrile, and said adduct is present in a proportion in the range of 10 to 40 weight percent of the total composition.

References Cited

UNITED STATES PATENTS

| | | |
|---|---|---|
| 2,924,532 | 2/1960 | Dereich. |
| 2,967,842 | 1/1961 | Roberts _____ 260—876 XR |
| 3,098,058 | 7/1963 | Schweiker et al. ____ 260—94.7 |
| 3,205,196 | 9/1965 | Creighton. |
| 3,269,963 | 8/1966 | Ilgemann et al. __ 260—876 XR |

FOREIGN PATENTS 931,915   7/1963   Great Britain.

MURRAY TILLMAN, Primary Examiner

U.S. Cl. X.R.

260—94.7, 45.7, 45.75, 45.85, 45.95, 889, 890, 892